United States Patent

[11] 3,597,653

[72] Inventors James H. Moore
 Scotia;
 Ernest J. Schirmer, II, Highland, both of, N.Y.
[21] Appl. No. 29,531
[22] Filed Apr. 17, 1970
[45] Patented Aug. 3, 1971
[73] Assignee General Electric Company

[54] DIGITAL LOW SPEED SWITCH
 6 Claims, 2 Drawing Figs.
[52] U.S. Cl..................................................... 317/5
[51] Int. Cl..................................................... H02p
[50] Field of Search............................................ 317/5

[56] References Cited
 UNITED STATES PATENTS
 2,993,147 7/1961 Wright Jr. et al. ............ 317/5 X 3,264,496 8/1966 Scholl............................ 317/5 X
3,365,614 1/1968 Luongo et al.................. 317/5

Primary Examiner—Lee T. Hix
Attorneys—William C. Crutcher, Bryan C. Ogden, Frank L. Neuhauser, Oscar B. Waddell and Joseph B. Forman ABSTRACT: A low speed indicator for detecting very low speeds of a rotating shaft has digital logic elements and a single sensor so that if shaft rotation stops or falls below the desired minimum speed, the device will actuate a switch to sound an alarm or automatically engage the turning gear of a turbine. A digital clock generates a preset frequency of pulses which is compared to the frequency of pulses generated by a sensor positioned near a toothed wheel, on the turbine shaft and if the proper condition exists, a counter produces a logic "1" to actuate a switch for engaging the turning gear or sounding an alarm.

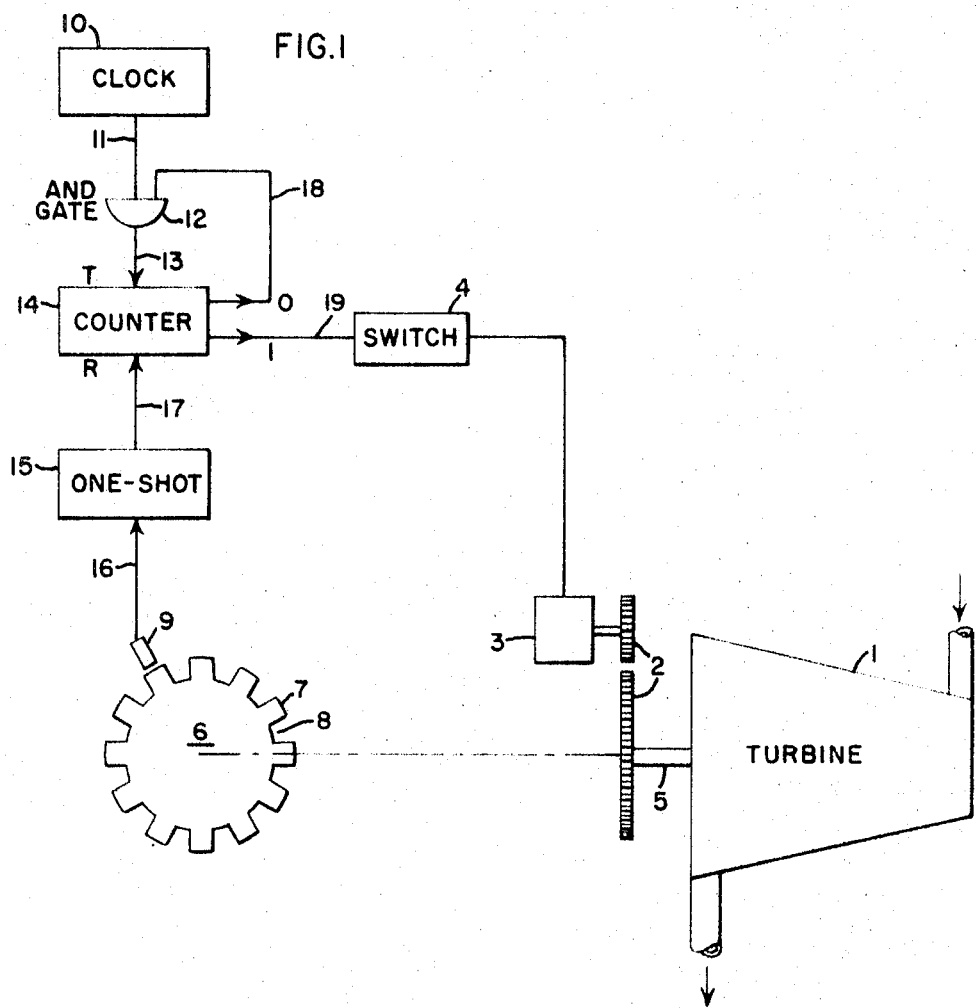
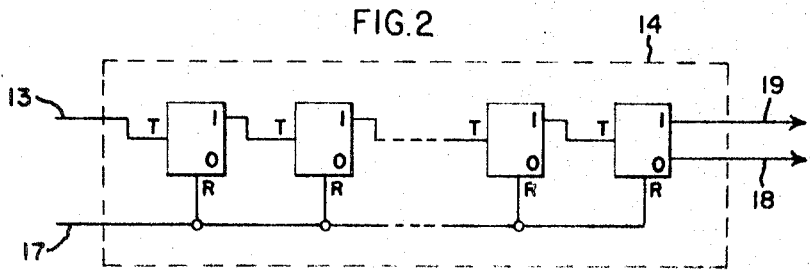
INVENTORS:
JAMES H. MOORE,
ERNEST J. SCHIRMER, II
BY Bryan C. Ogden
THEIR ATTORNEY.

DIGITAL LOW SPEED SWITCH

BACKGROUND OF THE INVENTION

The present invention relates generally to a device for indicating a stopped or very slow rotating condition of a shaft.

When a large steam turbine is allowed to come to rest for a relatively short period following operation under load, its rotor will bow very quickly due to uneven thermal gradients. A "turning gear" is usually provided so that the shaft will continue to rotate once it reaches a minimum predetermined speed or, if the shaft stops, the turning gear is engaged such that the shaft will begin to rotate at a low speed. Due to the long coasting time from shutdown of the steam flow to stoppage of the turbine shaft, it is inconvenient to have an operator constantly attend the turbine, and consequently it has been proposed to utilize very reliable hydraulic, fluidic or electrical devices, to detect the condition when the shaft speed has decreased below the turning gear speed or below the speed at which the alarm will sound. These devices are sometimes called "zero speed" indicators and frequently are designed to automatically engage the "turning gear." Such devices have used variable magnetic reluctance sensors or intermittently interrupted hydraulic jets mounted near a toothed wheel.

Prior art devices of this general type are based on detecting operation below a desired speed by timing the interval between the passing of teeth by a sensor. Each time interval is initiated when the signal from the sensor is removed and is terminated by the arrival of the next signal. At least two sensors were always required in order to prevent the possibility of the shaft stopping in a position that caused a continuous signal from the sensor, thereby preventing the time interval from being initiated. An example of such a device may be seen by referring to U.S. Pat. No. 3,365,614 issued to M. C. Luongo et al. on Jan. 23, 1968. In the present invention only a single sensor is required because a "one-shot" converts each signal from the sensor to a single pulse of fixed time length that is independent of the speed or position of the shaft.

Of course, utilizing two sensors introduces a factor of decreased reliability. Should either of the sensors in the prior art devices malfunction, the low speed indicator would be inoperative and the consequences of such a low speed indicator not operating properly, could be serious damage to the turbine rotor. Thus, the desirability of a low speed indicator which requires but one sensor in order to generate the proper shaft speed signal is apparent. Providing additional sensors with such a device would increase the reliability because the device would not malfunction unless all of the sensors failed.

Accordingly, one object of the present invention is to provide an improved low speed indicator which is simple and which has improved reliability.

Another object of the invention is to provide a low speed indicator which utilizes a single sensor.

DRAWING

The subject matter which is regarded as the invention is particularly pointed out and distinctly claimed in the concluding portion of the specification. The invention, however, both as to organization and method of practice, together with further objects and advantages thereof, may best be understood by reference to the following description, taken in connection with the accompanying drawing, in which:

FIG. 1 is a simplified schematic representation of the present invention.

FIG. 2 is a schematic representation showing the contents of the counter.

SUMMARY OF THE INVENTION

Briefly stated, the present invention is practiced in one form by allowing pulses (at a preset frequency) from a logic clock to be accumulated by a series of flip-flops connected to perform as a binary counter until a predetermined count is reached at which time a logic "1" output occurs at the counter and its complement, a logic "0" inhibits further counting by blocking clock pulses at an AND gate positioned between the clock and counter. This prevents the counter from continuing to count and resetting itself to zero. Pulses from a single sensor trigger a "one-shot" whose output resets the counter to zero by resetting each flip-flop in the counter. When the shaft rotates above the desired minimum speed, the time interval between each pulse from the "one-shot" is short enough to prevent the counter from ever counting out and generating the logic "1" to start the turning gear. When the shaft is stopped or rotating below the minimum desired speed, there is time for the counter to count out before it can be reset by a pulse from the "one-shot" and a logic "1" is generated which causes the turning gear to engage and accelerate the shaft above the minimum desired speed.

DESCRIPTION OF THE PREFERRED EMBODIMENT

Referring now the drawing, the conventional elements comprise a steam turbine 1 having an engageable set of turning gears 2, a turning gear motor 3, and a gear engaging actuator or switch 4, these elements being shown symbolically. It is the turbine shaft 5 which may become bowed from excessive temperature gradients if the steam turbine 1 is allowed to remain at rest. It will of course be appreciated that during normal operation and at shaft speeds above the normal turning gear speed, the turning gear 2 will be disengaged. At the command from the proper signal, generated by the indicator circuit of the present invention, the turning gears 2 will become engaged and motor 3 will continue to turn the shaft 5 allowing it to cool in a proper manner. The gear arrangement is such that if the turbine speed exceeds the turning gear speed after the gears have become engaged, immediate disengagement will occur.

Attached to the turbine shaft 5 and mounted so as to rotate with the same speed, is a toothed wheel 6 which includes alternately spaced teeth 7 and notches 8 therebetween. Mounted in close proximity with the toothed wheel 6 is a single sensor 9. Sensor 9 is a commercially obtainable device which in the case of an electrical device provides a signal as the magnetic reluctance changes due to the presence or nonpresence of magnetic material. It is of course known to those skilled in the art that as the toothed wheel 6 rotates, the configuration of teeth 7 and notches 8 will cause the sensor 9 to emit pulses, the frequency of which depends directly on the rotational speed of wheel 6 and the number of teeth on the wheel. That is, more pulses are generated in a given time period when the wheel 6 is at a higher speed. It will be appreciated that a pulse can be generated when sensor 9 is in proximity with either a tooth 7 or a notch 8, depending upon the signal convention to be used. Here, it will be assumed that a pulse is generated when sensor 9 passes a tooth 7.

Turning now to a description of the indicator's logic circuitry, a logical clock or an astable flip-flop is indicated at 10 which generates a continuous series of pulses through line 11 to a logical AND gate 12. Clock 10 is commercially available from the Digital Equipment Corporation as part number R401. The clock 10 is adjustable such that the number of pulses per unit of time may be varied depending upon the minimum set speed desired below which actuation of switch 4 will engage the turning gear 2. This will be more fully understood when referring to the operation of the invention.

When the turbine shaft 5 is turning above the minimum set speed, for example on the order of 5 r.p.m., the pulses from the clock 10 pass through line 11, directly through the AND gate 12, through line 13 and into a digital counter or count register 14. Counter 14 is constructed from commercially obtainable flip-flops as is well known in the art and is able to accumulate digital pulses and also to be reset to 0 should a counteracting pulse from the monostable flip-flop or "one-shot" 15 appear at the other input to the counter 14. Counter 14 is obtainable from the Digital Equipment Corporation by combining the desired number of flip-flops as seen by referring to FIG. 2.

When the shaft 5 is rotating, sensor 9 generates pulses which pass through line 16 and actuate the "one-shot" 15 which is also commercially available from the Digital Equipment Corporation. The sensor 9 generates pulses according to the rotational speed of wheel 6, and it is these pulses that actuate "one-shot" 15 in order to produce an output on line 17 which is a square pulse of constant length regardless of the shape of its input pulse, thus indicating a digital output from "one-shot" 15. The number of output pulses from "one-shot" 15 is equal to the number of signals generated by sensor 9. The sensor 9 and "one-shot" 15 will be referred to as the speed sensing means.

When the turbine shaft 5 and wheel 6 are rotating at a speed above the minimum set speed, the counter 14 will never accumulate enough pulses from clock 10 to generate a logic "1" since it will continually be reset to zero as the pulses passing through line 17 appear at the input of counter 14. The "T" and "R" shown above and below the counter 14 on the drawing indicate that the pulses from clock 10 appearing at the input of counter 14 will trigger the operation of the counter and that the pulses from "one-shot" 15 will reset the counter respectively. Accordingly when the rotational speed of the wheel 6 is below the minimum set speed, the counter 14 will accumulate enough pulses from the clock 10 to reach a predetermined count without being reset. This causes the signal on line 19 to change from a logic "0" to a logic "1" and the signal on line 18 to change from a logic "1" to a logic "0." The removal of the logic "1" from line 18 at the input of the AND gate 12 will block the clock pulses from further accumulation in counter 14. The logic "1" output on line 19 operates a switch which is used to sound an alarm or engage the turning gear 2 through motor 3.

It should be noted that this device, like similar devices in the prior art, would have an intermittent output if the shaft continued to rotate indefinitely below the speed setting of the device, that is, the output would cycle between logic "1" and logic "0". In practice, this never happens because the shaft stops abruptly after coasting below the minimum speed at which hydrodynamic lubrication of the bearings takes place. After coasting below the speed which actuates the low speed switch, the shaft either stops very quickly or is accelerated by the turning gear to above the speed setting of the low speed switch to turning gear speed.

Before turning to a description of the operation, it is again mentioned that the present invention may be comprised of digital fluidic elements as each of the electronic digital elements referred to is also commercially available in fluidic form.

OPERATION

Although the general operation of the invention has been described in pointing out the arrangement of elements, the details of the operation will now be explained. Proper operation of the invention requires that the frequency response of the sensor and "one-shot" have a bandwidth greater than the maximum sensor pulse frequency at 120 percent rated turbine speed. This can be attained by properly selecting the number of teeth on the wheel. On the drawing, it will be seen that there are 12 teeth which will give 12 pulses per revolution, or 864 c.p.s. at 120 percent rated speed on a 3600 r.p.m. turbine which is well within the frequency range of both electronic and fluidic devices. Of course, this particular number of teeth should not be taken as a limiting factor but only by way of example.

As a further example, assume that it is desired to engage the turning gear when the speed of the turbine shaft falls to a value on the order of 1 r.p.m. At this speed, the sensor will generate a pulse every 5 seconds which will in turn appear as one digital pulse every 5 seconds at the counter. The clock has been preset such that it will generate pulses at a frequency of 6 per second to the counter. A binary counter consisting of 6 flip-flop stages will produce a logic "1" output on line 19 at any shaft speed less than approximately 1 r.p.m. This output operates the switch which in turn engages the turning gear or sounds an alarm. Further, when the same condition occurs, the logic "0" is directed to the AND gate which exhibits further accumulation in the counter.

Of course, it will be appreciated that any minimum set speed may be set on the clock. Thus, the low speed indicator of the present invention may be set so as to engage the turning gear at any preselected low speed of the turbine shaft.

It will further be appreciated that a low speed indicator is provided which utilizes but a single sensor to produce the desired results. The reliability of a device with a single sensor as compared on one of the prior art requiring two sensors is thus increased appreciably. Should redundancy be desired, it is a simple matter to provide additional sensors and "one-shots." This of course further increases the reliability of the low speed indicator.

It should be further pointed out that a failure mode of any device such as this which causes the turning gear to engage at a shaft speed in excess of the normal turning gear speed is more serious in terms of damage to the turbine or turning gear than one which results in failure of the turning gear to engage when it should. Malfunction of all devices in the present invention except for the sensor and the "one-shot" are "failsafe" since the effect of any such malfunction is the failure to generate the desired low speed indication. Therefore, any desired reliability of the device is easily achieved by providing redundant sensors and "one-shots."

What we claim is:

1. A low speed indicator for a rotatable shaft, comprising:
   speed sensing means adapted and arranged to generate a first output pulse dependent on the speed of the rotatable shaft,
   pulse generating means adapted and arranged to generate a second output pulse of preselected frequency,
   counting means having as inputs thereto the first and second output pulses and being adapted and arranged to accumulate the second output pulse to generate a logical "1" output, thereby indicating the low speed, and
   resetting means arranged and adapted to continually reset the counting means to a "0" logical output if the frequency of the first output pulse is above a preselected amount.

2. A device according to claim 1 further including a logical "AND" gate positioned in circuit with the pulse generating means and the counting means, having as inputs thereto the second output pulse and one output of the counting means, arranged so as to prevent further accumulation by the counting means when the logical "1" output is generated.

3. A device according to claim 1 further including means connected in circuit with the counting means and responsive to the logical "1" output, for protecting the rotatable shaft.

4. A device according to claim 3 wherein said means include a turning gear to rotate the shaft at turning gear speed.

5. A device according to claim 1 wherein the digital counting means is comprised of a plurality of interconnected flip-flops.

6. A device according to claim 1 wherein the speed sensing means include a "one-shot" device to generate a pulse of constant dimensions regardless of the shape of its input pulse.